United States Patent [19]

Shropshire et al.

[11] 4,124,693
[45] Nov. 7, 1978

[54] RECOVERY, MANIPULATION AND STORAGE OF BROMINE

[75] Inventors: Joseph A. Shropshire, Westfield; Daniel J. Eustace, Chatham, both of N.J.

[73] Assignee: Exxon Research & Engineering Co., Linden, N.J.

[21] Appl. No.: 833,132

[22] Filed: Sep. 14, 1977

[51] Int. Cl.$^2$ .......................... C01B 7/10; B01D 53/34
[52] U.S. Cl. ....................................... 423/503; 423/241
[58] Field of Search ................. 423/503, 241; 544/108

[56] References Cited

U.S. PATENT DOCUMENTS

| 1,917,762 | 7/1933 | Grebe et al. | 423/503 |
| 2,679,533 | 5/1954 | Darragh et al. | 544/108 X |
| 2,784,063 | 3/1957 | Block et al. | 423/503 |

FOREIGN PATENT DOCUMENTS 688,274  6/1964  Canada ..................................... 423/503

Primary Examiner—Earl C. Thomas
Attorney, Agent, or Firm—Joseph J. Dvorak

[57] ABSTRACT

An improved method of removing bromine from fluid streams comprises contacting the fluid stream with an aqueous solution of certain asymmetrical quaternary ammonium bromides whereby a liquid, water immiscible bromine complex is formed that can be stored, manipulated and readily handled and which complex can be dissociated to liberate molecular bromine.

16 Claims, 1 Drawing Figure

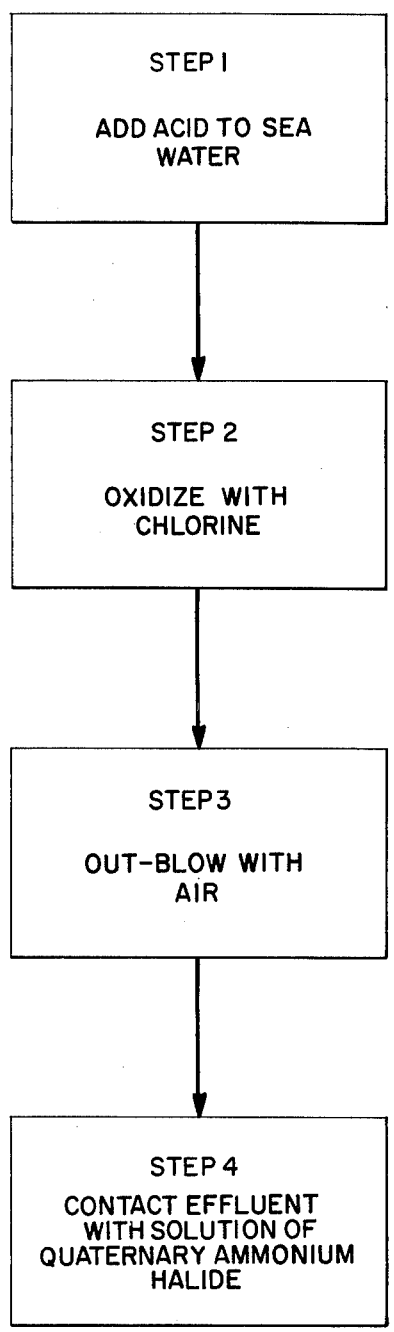

RECOVERY, MANIPULATION AND STORAGE OF BROMINE

FIELD OF THE INVENTION

This invention relates generally to the manipulation, storage and transportation of molecular bromine. More particularly, this invention relates to a process for recovering molecular bromine from fluid streams as a water-immiscible polybromide complex which is capable of releasing substantial amounts of molecular bromine upon being heated.

DESCRIPTION OF THE PRIOR ART

Recovery of bromine from sodium bromide brines and from other bromide-containing solutions is old in the art. In a typical bromine recovery process the brine is oxidized with chlorine to produce sodium chloride and dissolved bromine. Bromine is stripped from the solution by steam, by aeration or even by vacuum and then condensed and dried. Alternatively, the vaporized bromine can be fixed by chemical combination with a compound capable of reacting with the bromine, the preferred reaction for fixation being the reaction of sulfur dioxide with bromine according to the following equation:

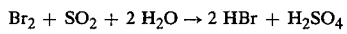

$$Br_2 + SO_2 + 2 H_2O \rightarrow 2 HBr + H_2SO_4$$

The resultant concentrated bromide or hydrobromic acid solution is subsequently treated with chlorine, for example, to generate bromine.

In U.S. Pat. No. 2,784,063, an alternative process for recovering bromine vapors from a gaseous mixture is disclosed in which an ammonium bromide solution or a solution of an alkyl or aryl ammonium bromide is used to complex the bromine. The bromine complex is subsequently thermally decomposed to liberate molecular bromine.

In these prior art techniques, the molecular bromine normally is stored in Monel or lead-lined drums. Even then, however, only exceptionally dry bromine can be transported and the containers are generally subject to corrosion even under the most stringent conditions of care and drying.

SUMMARY OF THE INVENTION

Generally speaking, the present invention contemplates an improved process for recovering molecular bromine from fluid streams containing bromine vapors by contacting the fluid stream with an aqueous solution containing a quaternary ammonium halide which is capable of forming a water-immiscible liquid polybromide complex with bromine, which complex remains a liquid at temperatures generally in the range of 10° C. to about 60° C. Additionally, the quaternary ammonium salt is one which will form a polyhalide complex containing at least 20 wt. % bromine and, preferably, it is one which will form a polyhalide complex containing from about 30 wt. % to about 70 wt. % bromine. Preferably, the quaternary ammonium halide is one which will form a polybromide complex with bromine which will have a bromine vapor pressure below about 0.1 atmosphere at a temperature of between about 20° C. and 50° C.

BRIEF DESCRIPTION OF THE DRAWING

The sole FIGURE is a schematic flow sheet illustrating the preferred embodiment of the present invention.

DETAILED DESCRIPTION OF THE INVENTION

The present invention will now be described in conjunction with the manufacture of bromine from sea water. However, it should be appreciated that the following description is merely illustrative of the preferred embodiment of the invention of which many variations may be made within the scope of the invention claimed herein by those skilled in the art without departing from the spirit thereof.

Referring now to the schematic diagram, sea water first is acidified with an acid such as hydrobromic or hydrochloric acid to a pH in the range generally of from about 3 to 4. This is shown as Step 1 in the FIGURE. Thereafter, the acidified solution is treated with molecular chlorine under which conditions the bromide salt contained in the brine is oxidized to liberate molecular bromine which remains in the solution because of its dilute concentration. This is shown as Step 2 in the FIGURE.

Referring now to Step 3 of the FIGURE, the chlorine treated solution is blown with large volumes of steam or air to desorb or entrain the bromine. The effluent from the outblown chlorinated sea water generally will contain 2–3% by volume of bromine in air and will be at temperatures ranging generally between about 70° C. to about 100° C. As is shown in Step 4, this stream of material can be brought into contact with the absorbing solution optionally by passing the fluid stream over the adsorbing solution or alternatively by bubbling the fluid stream through the absorbing solution and preferably by passing the fluid stream upward through an absorption tower from the bottom while the absorbing solution passes downwardly through the tower. Since the condensation of the bromine by the absorbing solution is an exothermic reaction, it is preferred to precool the absorbing solution to temperatures in the range of about 0° C. to about 30° C. and preferably from about 10° C. to about 20° C. In any event, during contact of the fluid stream with the absorbing solution it is desirable to maintain the temperature of the absorbing solution in the range of 15° C. to 25° C. by some form of external cooling.

The absorbing solution is an aqueous solution of a quaternary ammonium halide, preferably a quaternary ammonium bromide. The quaternary ammonium halides suitable in the practice of the present invention are defined by the following characteristics. First, the quaternary ammonium halide must be water soluble; second, it must be one which is capable of combining with molecular bromine; third, the bromine complex must be a substantially water immiscible liquid over a temperature range of from about 10° C. to about 60° C. and at least between 15° C. to 30° C.; fourth, the quaternary ammonium salt must be capable of forming a polybromide containing at least 20 wt. % bromine and preferably about 30 wt. % to about 70 wt. % bromine; fifth, the polybromide of the quaternary ammonium salt must have a vapor pressure below about 0.1 atm. at temperatures in the range of 20° C. to about 50° C.; and, finally, the polybromide must be capable of readily dissociating at temperatures ranging generally from about 15° C. up to about 100° C. to liberate molecular bromine. The quaternary ammonium halides preferably contemplated can be represented by the general structural formula:

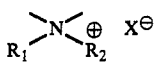

wherein the dangling valences of the nitrogen atom are connected to carbon atoms of saturated hydrocarbyl radicals forming a five-membered ring system including the nitrogen (thus the nitrogen atom is an endocyclic nitrogen atom) and a six-membered ring system including another heteroatom. Typically, the heteroatom will be oxygen or sulfur. In the above formula, $R_1$ is an alkyl or haloalkyl radical attached to the nitrogen atom by a carbon atom and $R_2$ is a different alkyl or haloalkyl radical attached to the nitrogen atom by a carbon atom. In the above formula, $R_2$ may be the same as $R_1$ when the saturated hydrocarbyl radical includes a lower alkyl or haloalkyl substituent of from 1 to 4 carbon atoms; otherwise $R_2$ is different from $R_1$. The anion of the salt generally is chloride or bromide anion, and especially is a bromide anion.

As a further illustration of the compounds contemplated by the present invention are asymmetrical piperidinium, pyrrolidinium and morpholinium salts represented by the following formulas:

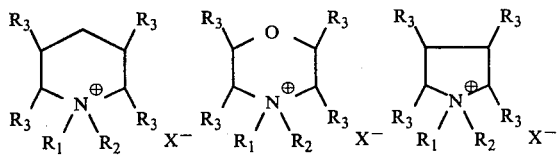

wherein $R_1$ is a methyl group and $R_2$ is selected from alkyl groups having from 1 to 8 carbon atoms, such as ethyl, propyl, isopropyl and the like and haloalkyl groups having from 1 to 8 carbon atoms such as chloromethyl and bromomethyl groups, and $R_3$ is independently at each occurrence selected from hydrogen and alkyl groups having from 1 to 4 carbon atoms; and when $R_3$ is hydrogen at each location, $R_2$ is different from $R_1$. The anion, $X^-$, in each of the foregoing is selected from bromide and chloride, and is preferably bromide.

Examples of compounds within the above-mentioned class of compounds are the following:

| Formula | Name |
|---|---|
| 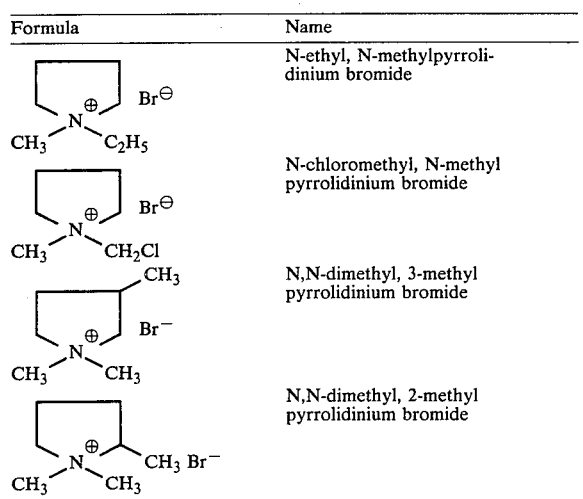 | N-ethyl, N-methylpyrrolidinium bromide |
| | N-chloromethyl, N-methyl pyrrolidinium bromide |
| | N,N-dimethyl, 3-methyl pyrrolidinium bromide |
| | N,N-dimethyl, 2-methyl pyrrolidinium bromide |

-continued

| Formula | Name |
|---|---|
| | N,N-dimethyl, 2,4-dimethyl pyrrolidinium bromide |
| | N-ethyl, N-methylpiperidinium bromide |
| | N,N-dimethyl, 3-methyl piperidinium bromide |
| | N-ethyl, N-methylmorpholinium bromide |
| | N-chloromethyl, N-methyl morpholinium bromide |
| | N,N-dimethyl, 3-methyl morphloinium bromide |
| | N,N-dimethyl, 2-methyl morpholinium bromide |
| | N,N-dimethyl, 2,5-dimethyl morpholinium bromide |

Preferably, a quaternary ammonium halide of the present invention is one in which the nitrogen atom is part of a six-membered ring system including another heteroatom. Particularly preferred halogen complexes of the present invention are asymmetric-substituted morpholinium bromides represented by the formula:

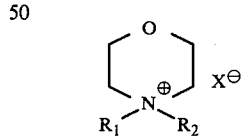

wherein $R_1$ is a methyl group and $R_2$ is selected from alkyl groups having from 2 to 8 carbon atoms such as ethyl, propyl, isopropyl and the like and haloalkyl groups having from 1 to 8 carbon atoms such as chloromethyl and bromomethyl groups.

The quaternary salt used in the absorbing solution of the present invention is dissolved in water where it is available to complex the molecular bromine contained in the fluid stream passed therethrough. The amount of quaternary ammonium salt used, for example the bromide, is not critical and it will depend on a number of factors such as reactor size, cooling requirements, and the like. Generally, however, solutions in the range of about 0.2 to 2.5 molar will be employed.

The above-mentioned quaternary ammonium salts are prepared by well known techniques. Typically, these compounds are prepared by reacting an appropriate tertiary amine with an appropriate alkyl halide. For example, N-methyl, N-ethyl morpholinium bromide can be prepared by reacting N-methyl morpholine with ethyl bromide in a suitable solvent.

Returning to Step 4, the effluent of the outblown chlorinated sea water is brought into contact with the absorbing solution and the bromine in the effluent fluid stream is complexed by the quaternary ammonium salt therein. This quaternary ammonium salt, being immiscible in water, separates as a water insoluble complex. Contact of the bromine-containing fluid stream with the aqueous phase, of course, is continued preferably until the oil contains about 20 wt. % and preferably about 30% to 70 wt. % bromine. The quaternary ammonium salts have the capability of absorbing additional amounts of bromine greater than 70 wt. %. However, it is not desirable to continue the contacting to form a polybromide having greater than about 70 wt. % bromine and since the vapor pressures of such materials tend to be higher and the stability of such materials generally are not satisfactory.

As indicated hereinabove, the polybromide separates as a water immiscible liquid complex which is readily separated from the aqueous phase. Consequently, the complexed bromine can be easily pumped and readily manipulated, stored or transported. The bromine can subsequently be separated by dissociation of the liquid complex. Dissociation is simply affected in most instances by removing the partial vapor pressure of gaseous bromine in contact with the complex. This can be achieved by purging the liquid complex or sweeping the vapor space above the liquid with an inert gas stream. Alternatively, dissociation is affected by heating the oil at ambient pressures. The so-liberated bromine vapors can be condensed and collected by normal techniques. The debrominated solution, of course, can be used again for absorbing bromine from the outblown chlorinated sea water.

While the invention has been described in connection with the preparation of bromine from sea water, it should be readily apparent that any brine-containing solutions, the salt of which is oxidizable with chlorine, can be treated pursuant to the practice of this invention. Thus, the bromine brine most frequently used is sea water. However, there are many other natural brines and also artifificially made brines which can be so treated. Whether artifical or natural, however, the most preferred brines in the practice of the present invention will be those containing high concentrations of bromine.

The following specific examples are given to further explain and illustrate the present invention. They are not intended to limit the scope of the invention in any manner.

EXAMPLE 1

In this example, aqueous solution of the quaternary ammonium salt listed in Table I below were exposed to $Br_2$ vapor in a closed chamber. The clear liquid samples absorbed the bromine and a red-brown water immiscible oil formed. A summary of the tests is given in Table I.

TABLE I

| Run No. | Name | Quaternary Ammonium Compound | | Bromine Absorbed, gms |
|---|---|---|---|---|
| | | Concentration | Amount | |
| 1 | N-methyl, N-ethyl morpholinium bromide | 60 wt. % | 3.49 gm | 11.75 gm |
| 2 | N-chloromethyl, N-methyl morpholinium bromide | 80 wt. % | 0.81 gm | 1.53 gm |

EXAMPLE 2

In this example, 1.0 M aqueous solution of N-methyl, N-ethyl morpholinium bromide containing 3.0 M $ZnBr_2$ and 0.20 M $ZnSO_4$ was electrolyzed to produce a known amount of bromine. The bromine thus generated was complexed by the morpholinium salt resulting in the formation of a red-brown water immiscible phase. The two phases were separated and analyzed for bromine. The test is summarized in Table II below:

TABLE II

| Weight of Sample | Weight of Bromine | Fraction of Bromine in Complex |
|---|---|---|
| 3.22 gm | 0.70 gm | 0.99 |

EXAMPLE 3

Solutions (3.22 gm each) containing 1.0 M N-methyl, N-ethyl morpholinium bromide, 3.0 M $ZnBr_2$ and 0.20 M $ZnSO_4$ were electrolyzed at a specific temperature to produce 0.35 gm of bromine. A bromine complex, which was brown-red water immiscible oil, formed. The resultant two layered mixtures were analyzed by separating the phases and determining the bromine content of each phase. Table III below summarizes the data obtained.

TABLE III

| Run No. | Temperature, ° C | Fraction of $Br_2$ in complex |
|---|---|---|
| 1 | 23° | 0.95 |
| 2 | 40° | 0.92 |
| 3 | 50° | 0.92 |
| 4 | 60° | 0.91 |

EXAMPLE 4

Following the general procedure outlined in Example 2, bromine was generated electrolytically and complexed with each of the following quaternary ammonium bromides:

N-methyl, N-ethyl morpholinium bromide
N-chloromethyl, N-methyl morpholinium bromide
N-methyl, N-ethyl pyrrolidinium bromide
2,4,4-trimethyl morpholinium bromide The bromine complexes that were formed were separated and subjected to NMR spectroscopy. All of the foregoing complexes were stable compounds at ambient temperatures. Indeed, bromine complexes of these quaternary ammonium salts containing between about 20 wt. % and 70 wt. % bromine prepared as outlined in Examples 1 and 2 have been stored for periods ranging from about 2 months to about 1½ years.

EXAMPLE 5

Two liquid samples weighing 21.2 gm and 13.3 gm, each containing 60 wt. % bromine complexed with N-methyl, N-ethyl morpholinium bromide were placed in separate flasks and sparged with dry nitrogen. The effluent gas stream was then passed into a 1.0 N potassium oxide solution. The samples lost 6.0 gm and 4.4 gm respectively and analysis of the KI solution confirmed that 6.0 gm and 4.4 gm of bromine vapor was evolved.

What is claimed is:

1. In the process of extracting bromine from a bromine vapor containing fluid stream by contacting said fluid stream is an adsorption stage with an aqueous ammonium salt containing solution to form polybromides in said solution, the improvement comprising:

contacting said bromine containing fluid stream which an aqueous solution of a quaternary ammonium salt selected from asymmetric quaternary ammonium compounds having the formula

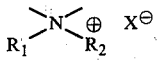

wherein the dangling valence of nitrogen indicates that nitrogen is an endocyclic nitrogen atom connected to carbon atoms, and in which said nitrogen atom and said carbon atoms form a ring structure selected from a saturated five-member ring structure and a saturated six-member ring structure including an additional heteroatom and where $X^-$ is a halide selected from chloride and bromide, $R_1$ is selected from an alkyl group and haloalkyl group of from 1 to 8 carbon atoms and $R_2$ is selected from alkyl groups or haloalkyl groups of from 1 to 8 carbon atoms but different from $R_1$, and which asymmetric quaternary ammonium compound is capable of combining with molecular bromine to form a polybromide which is a substantially water immiscible liquid at temperatures in the range of about 10° C. to about 60° C., whereby bromine is extracted from said bromine containing fluid stream in the form of a water immiscible bromine containing oil.

2. The process of claim 1 wherein the quaternary ammonium compound is selected from piperidinium, pyrrolidinium and morpholinium salts represented by the formulas:

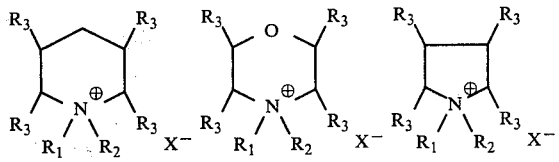

wherein $R_1$ is a methyl group and $R_2$ is selected from alkyl groups and haloalkyl groups having from 1 to 8 carbon atoms, $R_3$ is independently at each occurrence selected from hydrogen and alkyl groups having from 1 to 4 carbon atoms, and when $R_3$ is hydrogen at each location $R_2$ is different from $R_1$; and $X^-$ is a halide selected from chloride and bromide.

3. The process of claim 2 wherein the halide $X^-$ is bromide.

4. The process of claim 3 wherein the quaternary ammonium bromide is a morpholinium bromide having the formula:

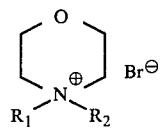

wherein $R_1$ is a methyl group and wherein $R_2$ is selected from the group consisting of alkyl groups having from 2 to 8 carbon atoms and chloromethyl group.

5. The process of claim 4 wherein the quaternary ammonium bromide is N-methyl, N-ethyl morpholinium bromide.

6. The process of claim 4 wherein the quaternary ammonium bromide is N-chloromethyl, N-methyl morpholinium bromide.

7. The process of claim 3 wherein the quaternary ammonium bromide is a pyrrolidinium bromide.

8. The process of claim 3 wherein the quaternary ammonium bromide is a piperidinium bromide.

9. The process for extracting bromine from fluid streams containing bromine vapor comprising contacting said fluid stream with an aqueous solution of a quaternary ammonium salt, maintaining such quaternary ammonium salt solution during said contacting at a temperature in the range of about 15° C. to 25° C., said solution being an aqueous solution of an asymmetric quaternary ammonium salt having the general formula

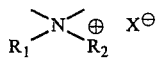

wherein the dangling valences of nitrogen indicate that the nitrogen forms with saturated carbon atoms part of an endocyclic structure selected from a five-member ring structure and a six-member ring structure including an additional heteroatom and wherein $X^-$ is a halide selected from chloride and bromide, $R_1$ is selected from alkyl groups and haloalkyl groups having 1 to 8 carbon atoms and $R_2$ is selected from different alkyl groups or haloalkyl groups of from 1 to 8 carbon atoms than $R_2$ and in which said asymmetric quaternary ammonium compound is capable of combining with said bromine to form a substantially water immiscible polybromide complex having from about 20 wt. % to about 70 wt. % bromine, said polybromide complex being liquid at temperatures in the range of about 10° C. to about 60° C., whereby said bromine is extracted in the form of a water immiscible oil.

10. In the process of recovering bromine from aqueous brines wherein the brine is acidified and thereafter oxidized to form a bromine solution and the bromine is swept from the solution by purging the bromine solution with a gas, the improvement comprising contacting said bromine swept from the solution with an aqueous solution of an asymmetric quaternary ammonium halide having the general formula

wherein the dangling valence of nitrogen indicates that nitrogen is an endocyclic nitrogen atom connected to carbon atoms with which said nitrogen atom forms a ring structure selected from a saturated five-member ring structure and a saturated six-member ring structure including an additional heteroatom and wherein X⁻ is a halide selected from chloride and bromide, $R_1$ is selected from an alkyl grop and haloalkyl group of from 1 to 8 carbon atoms and $R_2$ is selected from alkyl groups or haloalkyl groups of from 1 to 8 carbon atoms but different from $R_1$, said asymmetric quaternary ammonium bromide being capable of forming a polybromide complex with bromine, said polybromide complex being one which is water immiscible and a liquid at temperatures in the range of about 10° C. to about 60° C., said aqueous solution of said quaternary ammonium complex being in an amount sufficient to form a water immiscible bromine complex containing from about 20 wt. % to 60 wt. % bromine.

11. The improvement of claim 10 wherein said aqueous solution is maintained at a temperature of about 15° C. to about 25° C.

12. The improvement of claim 11 wherein said water immiscible complex is separated and thereafter said complex is dissociated to generate bromine.

13. The improvement of claim 12 wherein said dissociation is affected by purging said complex with an inert gas.

14. A method of manipulating, transporting and storing elemental bromine which comprises: contacting elemental bromine with an aqueous solution of an asymmetric quaternary ammonium salt to form a polybromide, said quaternary ammonium salt having the following general formula

wherein the dangling valence of nitrogen indicates that the nitrogen is bonded to carbon atoms with which it forms part of a cyclic structure selected from a five-member ring structure, a six-member ring structure including an additional heteroatom wherein X⁻ is a halide selected from chloride and bromide, $R_1$ is selected from alkyl groups and haloalkyl groups of from 1 to 8 carbon atoms, and $R_2$ is selected from different alkyl groups or haloalkyl groups of from 1 to 8 carbon atoms than $R_1$, said quaternary ammonium salt being capable of forming a polybromide complex with bromine and wherein said polybromide complex is a water immiscible oil at temperatures in the range of about 10° C. to about 60° C. having a vapor pressure below about 0.1 atm. and wherein said polybromide contains between about 20 wt. % to about 70 wt. % bromine; separating said polybromide complex; maintaining said polybromide complex in an appropriate container; thereafter dissociating said liquid polybromide complex to generate bromine vapors, whereby said bromine has been manipulated, transported and stored as a liquid polybromide complex.

15. The method of claim 14 wherein said dissociating is affected by purging said liquid polybromide complex with an inert gas.

16. The method of claim 14 wherein said dissociating is affected by heating said oil at ambient pressures.

* * * * *